US006241889B1

(12) United States Patent
Haley, III (10) Patent No.: US 6,241,889 B1
(45) Date of Patent: Jun. 5, 2001

(54) TRICKLE TOWER FILTER APPARATUS AND LOOPED CORD BIOMEDIA FILTER CARTRIDGE FOR USE THEREIN

(75) Inventor: John W. Haley, III, Providence, RI (US)

(73) Assignee: Bioprocess Technologies, Ltd., Providence, RI (US)

( * ) Notice: Subject to any disclaimer, the term of this patent is extended or adjusted under 35 U.S.C. 154(b) by 0 days.

(21) Appl. No.: 09/410,559

(22) Filed: Oct. 1, 1999

Related U.S. Application Data
(60) Provisional application No. 60/102,858, filed on Oct. 2, 1998.

(51) Int. Cl.[7] .................................................. C02F 3/04
(52) U.S. Cl. ........................ 210/615; 210/150; 210/196; 210/197; 210/629
(58) Field of Search .................................. 210/150, 151, 210/194, 196, 197, 209, 232, 615, 629

(56) References Cited

U.S. PATENT DOCUMENTS

| | | | | |
|---|---|---|---|---|
| 2,008,507 | * | 7/1935 | Laughlin | 210/150 |
| 2,308,866 | * | 1/1943 | Dekema | 210/150 |
| 3,238,124 | * | 3/1966 | Burton | 210/150 |
| 3,275,147 | * | 9/1966 | Gilde | 210/150 |
| 4,422,930 | * | 12/1983 | Hatanaka | 210/150 |
| 4,451,362 | * | 5/1984 | Spelsberg | 210/150 |
| 4,717,519 | * | 1/1988 | Sagami | 210/150 |
| 4,729,828 | * | 3/1988 | Miller | 210/232 |
| 5,085,766 | * | 2/1992 | Born | 210/150 |
| 5,397,474 | * | 3/1995 | Henry | 210/150 |
| 5,622,630 | * | 4/1997 | Romano | 210/799 |
| 5,976,377 | * | 11/1999 | Hyfantis, Jr. et al. | 210/150 |

* cited by examiner

Primary Examiner—Christopher Upton
(74) Attorney, Agent, or Firm—Bartlett & Sherer (57) ABSTRACT

A looped cord biomedia filter cartridge is employed in a trickle tower filter to quickly and efficiently process wastewater. A base tank holds a volume of wastewater to be processed. The filter cartridge is mounted on top of the base tank and comprises a cylindrical frame having a plurality of upper and lower concentric hanger rings. The looped cord biomedia is interlaced, under tension, between the upper and lower concentric hanger rings to create a plurality of parallel, vertically extending, linear lengths of looped cord biomedia. The concentric hanger rings are radially spaced, and include circumferentially spaced notches for interlacing the looped cord biomedia. The spaced lengths of looped cord biomedia provide increased surface area while allowing sufficient space for water flow and air flow. Tensioning of the biomedia creates a highly desirable laminar downward flow of wastewater over the surfaces of the biomedia. The trickle tower further includes a spray bar assembly mounted on top of the filter cartridge, and a pump connected between the base tank and the spray bar assembly for circulating wastewater from the base tank to the spray bar. The spray bar provides a uniform distribution of wastewater over the top of the filter cartridge, the wastewater trickling down the vertical lengths of looped cord biomedia in a laminar flow where the wastewater comes into contact with biologically active microorganisms on the biomedia.

23 Claims, 12 Drawing Sheets

TRICKLE TOWER FILTER APPARATUS AND LOOPED CORD BIOMEDIA FILTER CARTRIDGE FOR USE THEREIN

This application claims the benefit of Provisional Application No. 60/102,858, filed Oct. 2, 1998.

BACKGROUND AND SUMMARY OF THE INVENTION

The instant invention relates to wastewater treatment apparatus and more particularly to a trickle tower system employing a looped cord biomedia filter cartridge.

Increasingly strict wastewater regulations and growing population densities have fueled extensive research into the area of wastewater treatment, and in particular, biologically active wastewater treatment systems. A critical component of biologically active wastewater treatment systems are biological fixing materials, or biomedia, on which biological microorganisms can grow and digest wastes within wastewater. The typical biomedia types currently in use include stones, ceramic pellets, wood chips, plastic strips, plastic tubes, packed sand and looped cord biomedia having a braided or knit backbone and a plurality of fibers or loops that radiate outwardly from the backbone. Although various types of biomedia are being used in different treatment facilities, there is still significant research being conducted on implementation of the biomedia to achieve the most efficient wastewater treatment. Efficient operation of the biomedia in waste digestion requires good circulation of both water and oxygen, extended contact of the wastewater with the biomedia and the ability to clear digested wastes. Accordingly, biomedia systems must provide means for circulating and aerating the wastewater to provide oxygen, or other select gases for the microorganisms to function in an efficient manner.

While existing applications of biomedia have been effective, and have been well received in the industry, there is nevertheless a continuing need for research and development of newer, smaller, more efficient systems for treating wastewater, and in particular there is a great need for new and improved biomedia filter assemblies for use in these systems.

In this regard, the instant invention provides a highly compact and highly efficient trickle tower filter assembly employing an improved looped cord biomedia filter cartridge. The trickle tower includes a base tank that holds a volume of wastewater to be processed. The biomedia filter cartridge is mounted on top of the base tank and comprises a cylindrical frame having a plurality of upper and lower horizontally extending, concentric hanger rings. The biomedia filter cartridge further comprises a looped cord biomedia that is interlaced, under tension, between the upper and lower hanger rings to create a plurality of parallel vertically extending, linear lengths of looped cord biomedia. The concentric hanger rings are equally radially spaced, and include equally circumferentially spaced notches for interlacing the looped cord biomedia. The looped cord biomedia provides a large amount of surface area in a small area and is thus an ideal fixing media for trapping highly dense populations of waste-digesting microorganisms. Tensioning the vertically extending lengths of looped cord media creates a highly desirably laminar downward flow of wastewater over the surfaces of the looped cord biomedia. Laminar flow maintains the water in uniform contact with the biomedia and exposes the water to prolonged contact with the biomedia, thereby achieving an improved biological filtration. Water is evenly distributed over the top of the filter cartridge by a rotatable spray bar assembly mounted on top of the filter cartridge. A pump connected between the base tank and the spray bar continuously circulates wastewater from the base tank to the spray bar. As the spray bar rotates it provide a uniform spray of wastewater over the top of the filter cartridge, the wastewater then trickling down the vertical lengths of looped cord biomedia in a laminar flow. During the downward flow, the wastewater comes into contact with the biologically active microorganisms on the biomedia and eventually trickles back into the base tank for re-circulation. The base tank, filter cartridge and spray bar elements are each constructed as a separate module to allow for expansion and the use of multiple stacked filter cartridges. Each module is surrounded by a side wall that essentially creates a self-contained environment that can be enriched with oxygen, or other select gases introduced into the wastewater.

Accordingly, among the objects of the instant invention are: the provision of a wastewater treatment apparatus that is compact and highly efficient at reducing nutrient compounds, such as $BOD_5$/COD, ammonia, and phosphor levels in wastewater; the provision of a trickle tower filter apparatus employing a vertically tensioned biomedia that promotes laminar flow of wastewater over the biomedia; the provision of a biomedia filter cartridge containing concentric hanger rings that equally space the biomedia, and hold the biomedia under tension; the provision of a trickle tower assembly that is modular and expandable for growing wastewater treatment needs; and the provision of a trickle tower apparatus that creates a substantially self-contained environment that can be enriched with pure oxygen, or other select gases.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
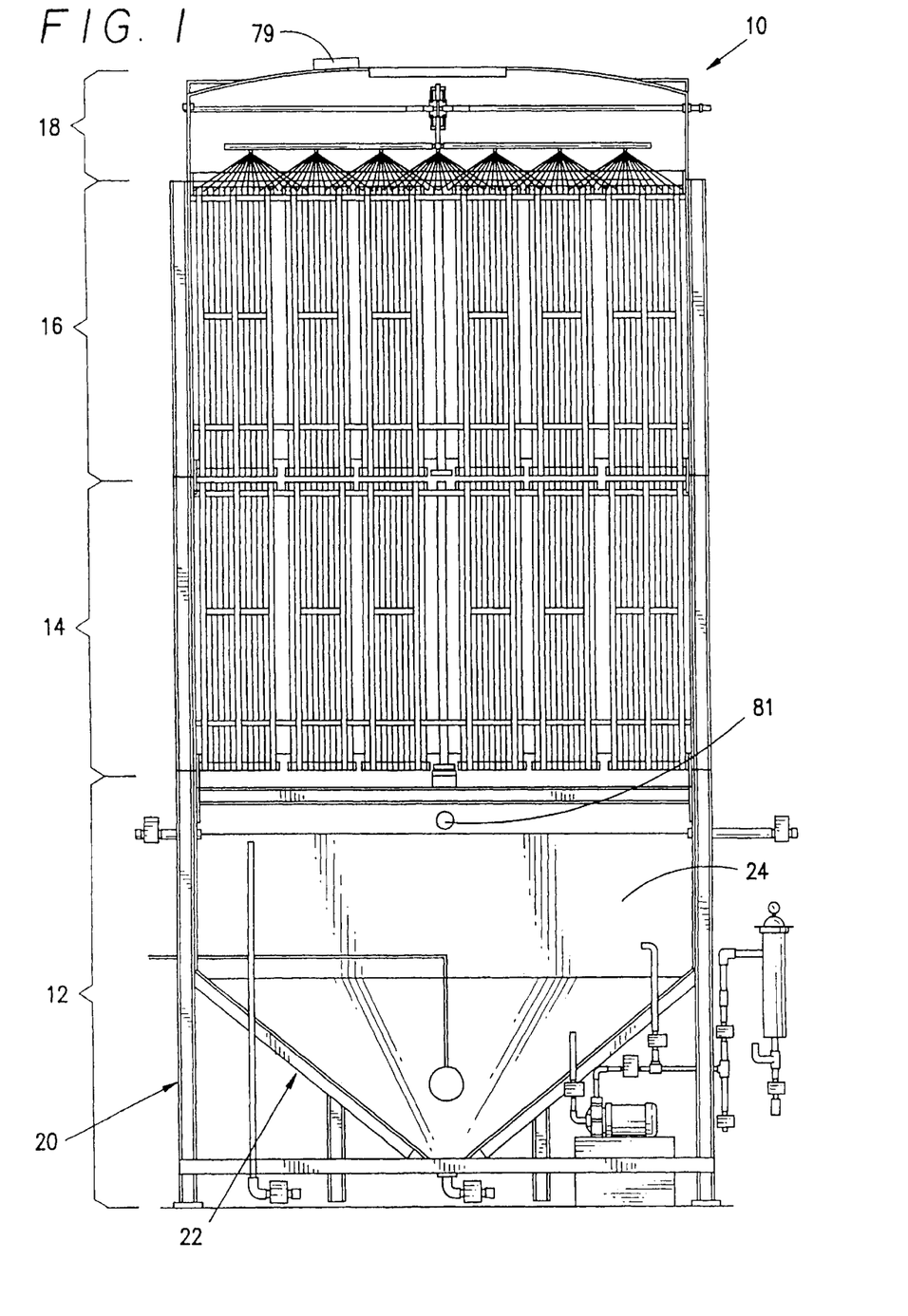
FIG. 1 is a cross-sectional view of a trickle tower constructed in accordance with the teachings of the present invention.
Figure 2:
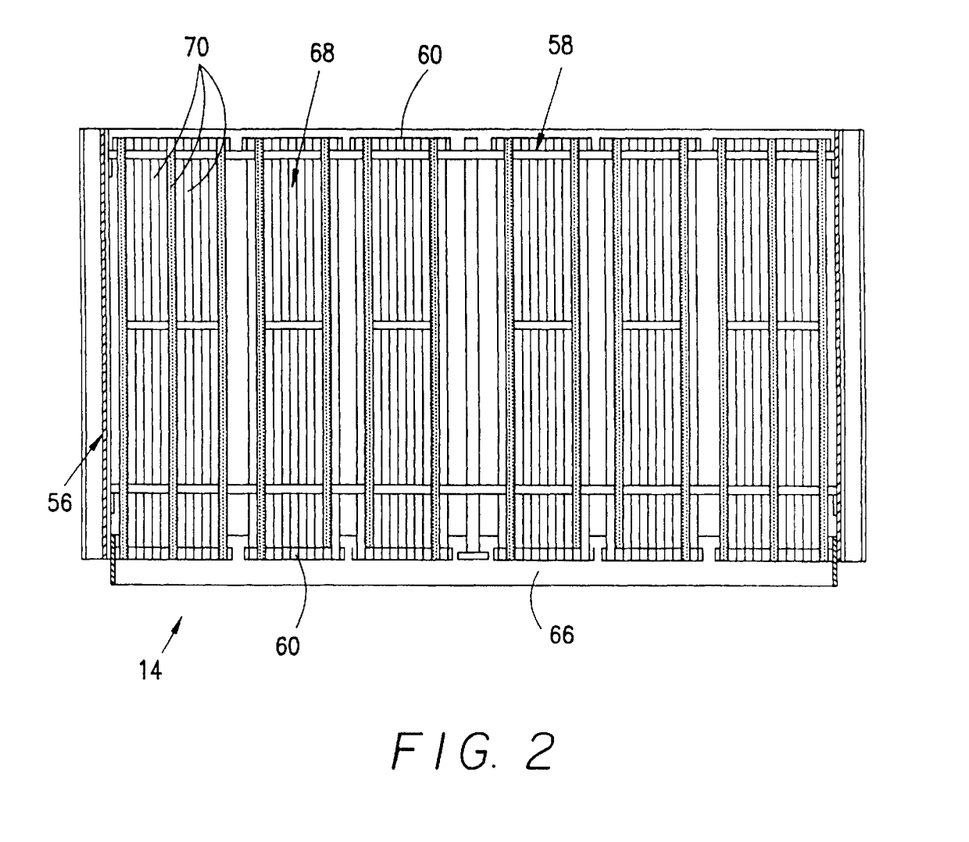
FIG. 2 is an enlarged cross-sectional view of the biomedia filter cartridge module as seen in FIG. 1.

Referring now to the drawings, the trickle tower filter apparatus of the instant invention is illustrated and generally indicated at 10 in FIG. 1. As will hereinafter be more fully described, the instant invention provides a highly compact and highly efficient trickle tower filter apparatus 10 employing an improved looped cord biomedia filter cartridge.

The trickle tower 10 includes a base tank module generally indicated at 12 that holds a volume of wastewater to be processed, a first biomedia filter cartridge module generally indicated at 14 mounted on top of the base tank module 12, a second biomedia filter cartridge module generally indicated at 16 mounted on top of the first filter module 14, and a spray bar module generally indicated at 18 mounted on top of the second filter cartridge module 16.

Figure 6:
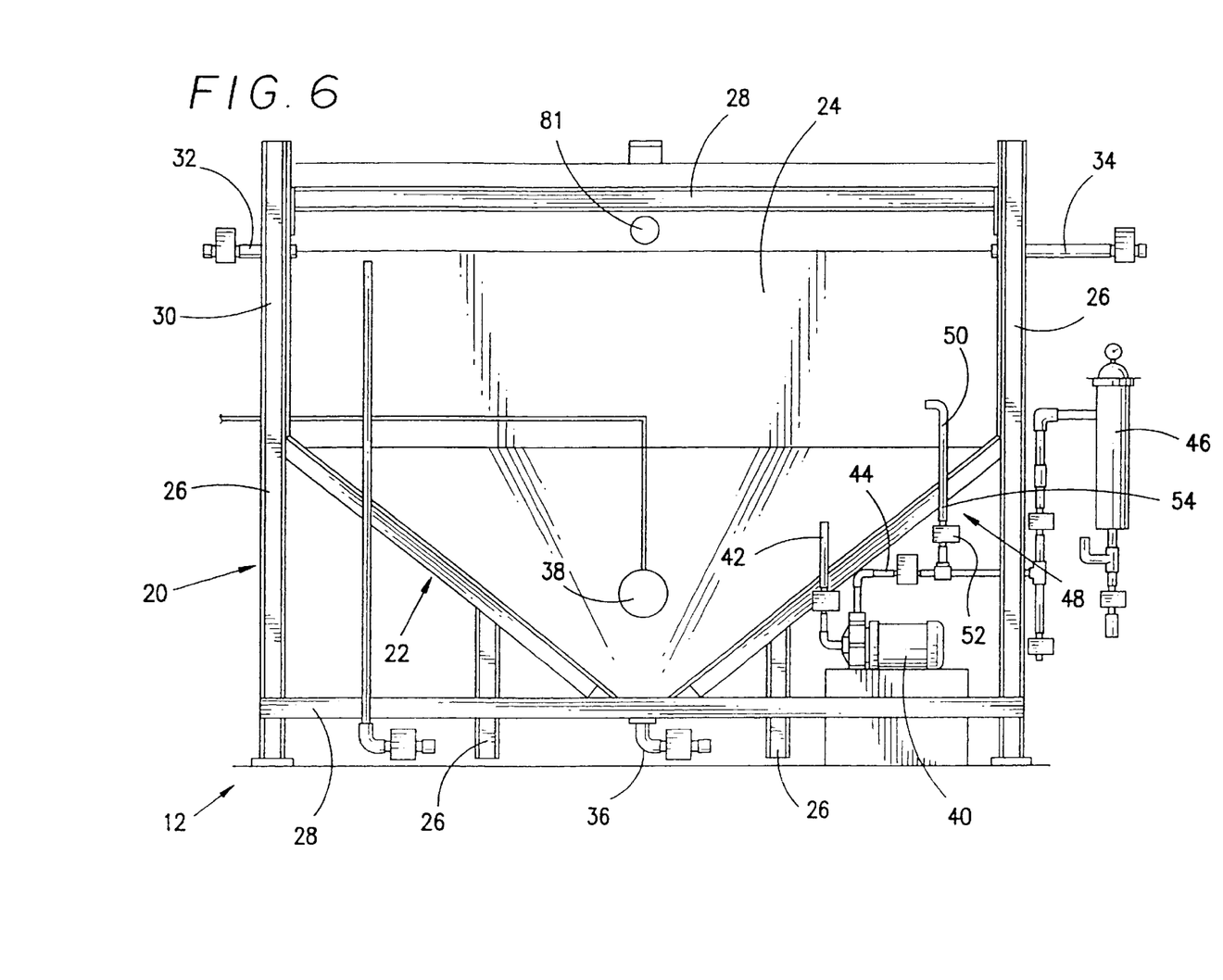
FIG. 6 is an enlarged cross-sectional view of the base tank module as seen in FIG. 1.

The base tank module 12 (See FIGS. 1 and 6) includes a frame assembly generally indicated at 20, and a re-circulation tank generally indicated at 22 mounted within the frame 20 for holding a volume of wastewater 24 to be processed. The frame 20 includes a plurality of supporting legs 26, cross braces 28 and an outer containment wall 30. The re-circulation tank 22 includes an inlet 32 for introducing influent into the tank 22, an outlet 34 for discharging treated effluent from the tank 22, a drain valve 36 for removing solids that settle within the tank 22, and a diffuser 38. The base tank module 12 further includes a pump 40 having an inlet feed pipe 42 from inside the tank 22 and an outlet pipe 44 that is connected to the spray bar module 18. Wastewater pumped from the tank 22 is first passed through a pre-filter 46 to remove large solids from the wastewater stream. The outlet pipe 44 also includes a re-circulation assembly generally indicated at 48 including a re-circulation pipe 50 feeding back into the tank 22 and valve 52 that can be opened or closed to selectively feed pumped wastewater back into the tank 22. This assembly 48 is used to control the pumping rate to the spray bar module 18. The re-circulation assembly 48 further includes an inlet nozzle 54 for injecting a gas, such as oxygen into the wastewater. Oxygen, or another select gas, can be supplied from a bottled source and regulated in a convention manner. Pumping oxygen into the wastewater increases the overall oxygen levels in the tower assembly 10 and increases the efficiency of the resident microorganisms in the digesting of waste.

Figure 3:
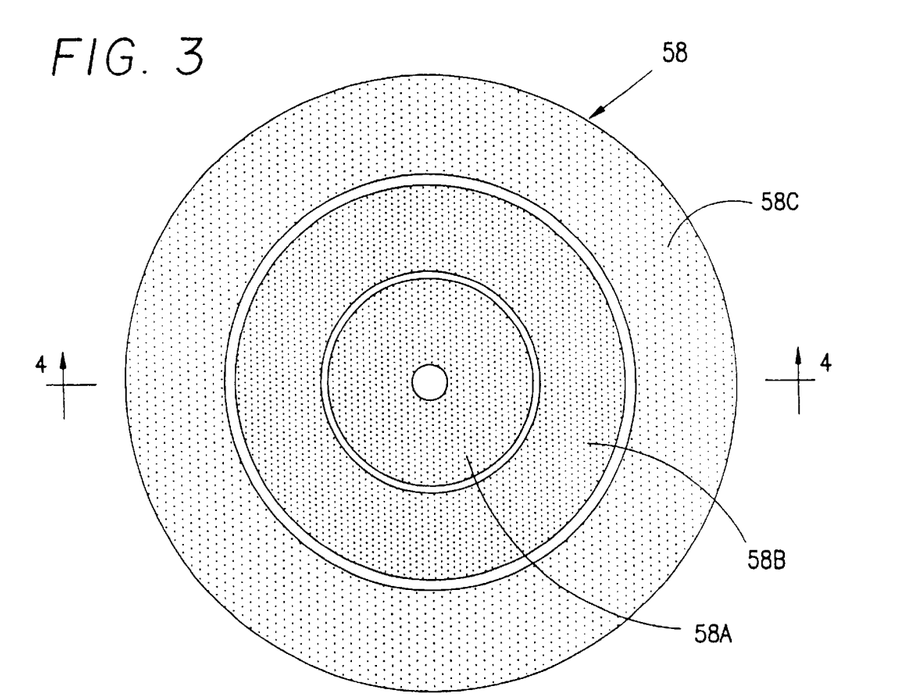
FIG. 3 is a schematic top view of the filter cartridge frame assembly.
Figure 3A:
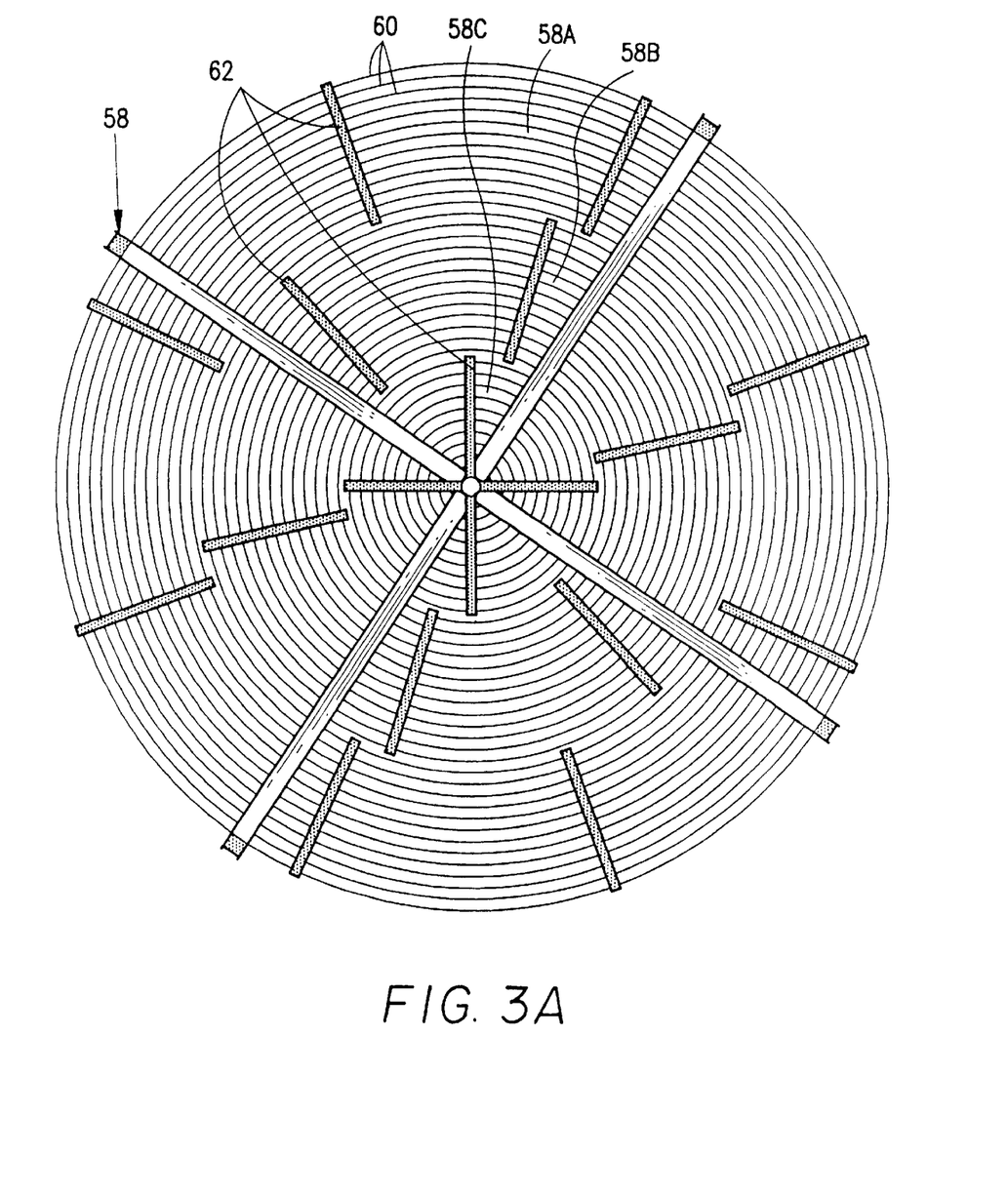
FIG. 3A is another top view of the filter cartridge frame assembly.
Figure 4:
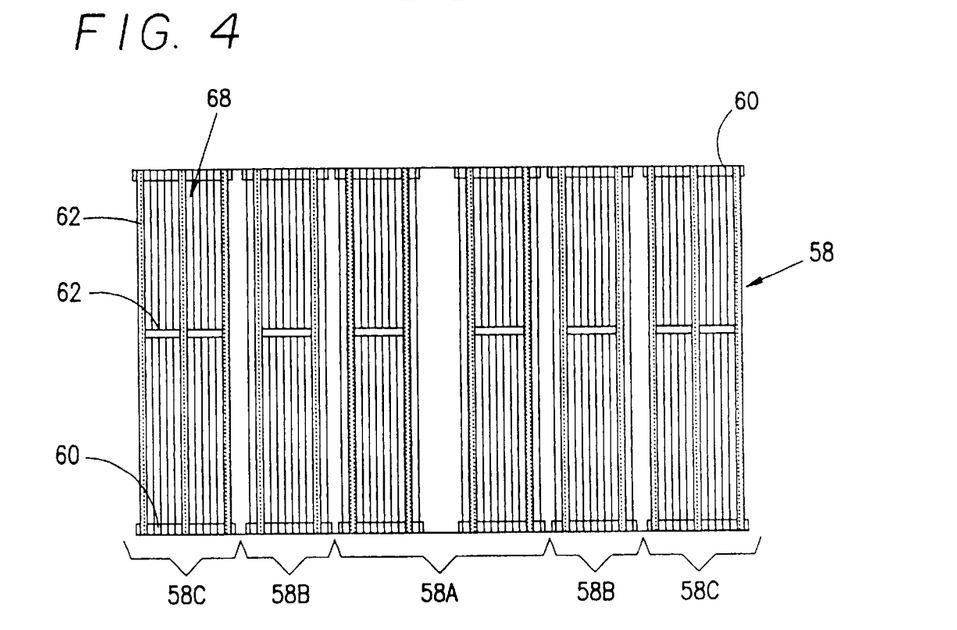
FIG. 4 is a cross-sectional view of the frame assembly as taken along line 4—4 of FIG. 3.
Figure 5:
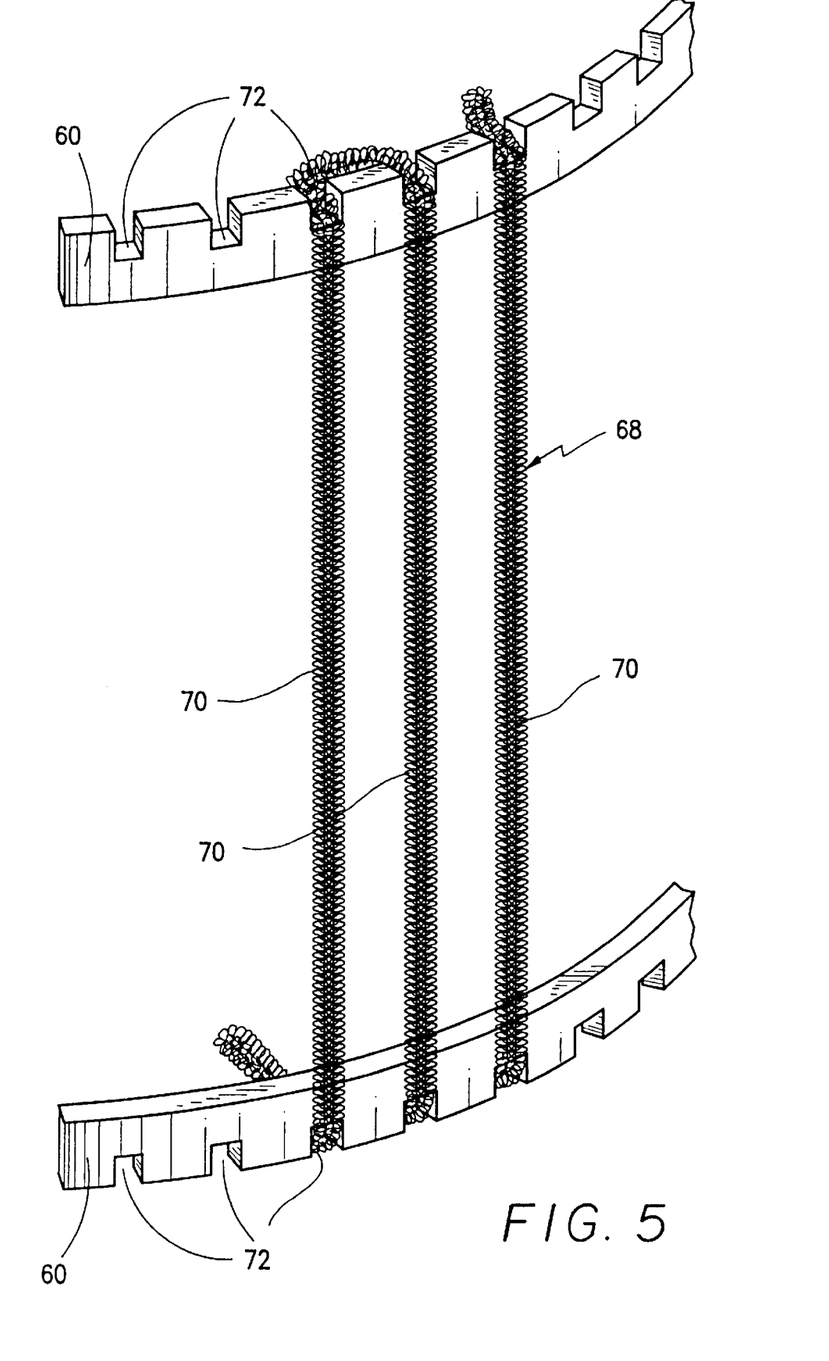
FIG. 5 is an enlarged fragmentary view of the hanger rings with the looped cord biomedia tensioned thereon.

Referring now to FIGS. 2–5. The first and second biomedia filter cartridges 14, 16 are identical in construction, each comprising a tubular containment housing generally indicated at 56, and a cylindrical frame assembly generally indicated at 58 having a plurality of upper and lower horizontally extending, concentric hanger rings 60. More specifically, the hanger rings 60 are mounted on three concentrically nested frame segments 58A, 58B, 58C, each segment including a plurality of hanger rings 60 and respective supports 62. The frame segments 58A–C, are in turn mounted within the tubular containment housing 56 having a side wall 64 and a lower drip edge, i.e. nesting shoulder 66, which nests within the upper edge of the base module containment wall 30, or on top of another filter cartridge module. Gaskets or o-rings (not shown) can be fitted between the modules to provide a more fully contained gaseous environment. The modular construction allows the use of a single filter cartridge, or multiple filter cartridges, as seen in the present embodiment. A looped cord biomedia 68 is interlaced, under tension, between the upper and lower hanger rings 60 to create a plurality of parallel vertically extending, linear lengths 70 of looped cord biomedia (see FIG. 5). It is noted that the individual lengths 70 of looped cord media are positioned in parallel vertical orientation rather than in angled zig-zag patterns as commonly seen in other submerged application media frames, and it is further noted that the media is tensioned between two spaced hangers 60 in contrast to other draped "sessile" media applications where the media hangs from a single upper hanger and is free at the bottom end. Looped cord biomedia 68 of the type contemplated herein is commercially available from several different sources. The concentric hanger rings 60 are equally radially spaced (See FIG. 3A), and include equally circumferentially spaced notches 72 for interlacing the looped cord biomedia 68 (See FIG. 5). The looped cord biomedia 68 provides a large amount of surface area in a small area, and is thus an ideal fixing media for trapping highly dense populations of waste-digesting microorganisms. Tensioning the vertically extending lengths 70 of looped cord media 68 creates a highly desirably laminar downward flow of wastewater over the surfaces of the looped cord biomedia 68. Laminar flow maintains the water in uniform contact with the biomedia and exposes the water to prolonged contact with the biomedia, thereby achieving an improved biological filtration. This type of laminar flow differs from packed media found in other trickle tower apparatus. Packed media, such as stones, plastic pieces, wood chips, ceramic pieces and other randomly placed media do not provide wastewater with a laminar flow such as found in the present looped cord media cartridge. Unlike tensioned media, packed media causes a problem called channeling where wastewater flows through the path of least resistance and short circuits other areas of the packed media where solids have collected. Areas that do not receive wastewater and air provide little or no aerobic wastewater digestion. In contrast, wastewater flowing through the present looped cord media cartridge 14 travels along a plurality of unobstructed paths which maximize wastewater flow, air flow and microbe contact.

Figure 7:
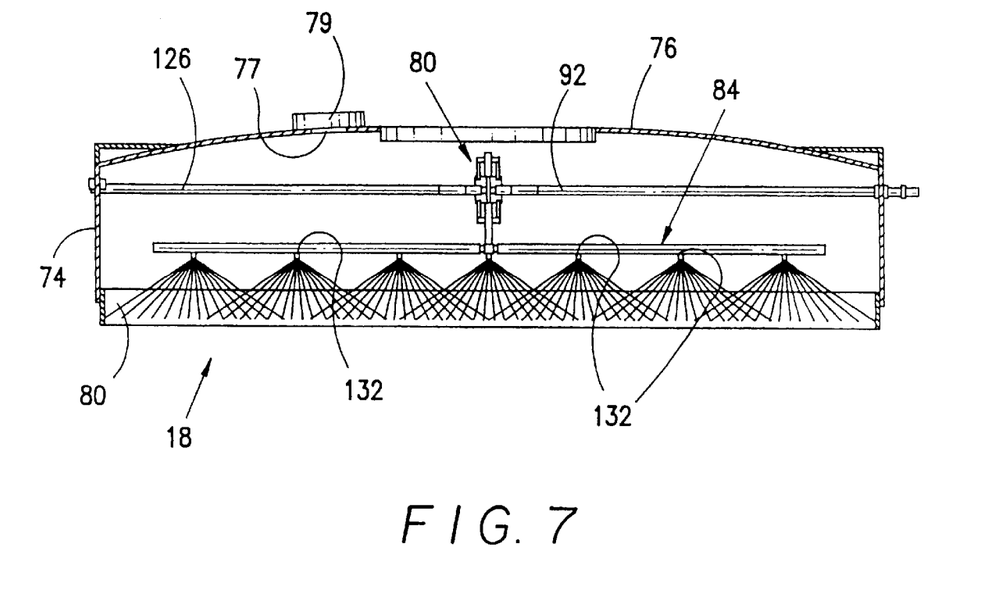
FIG. 7 is an enlarged cross-sectional view of the spray bar module as seen in FIG. 1.

Water is evenly distributed over the top of the filter cartridges 14, 16 by the spray bar module 18 mounted on top of the second filter cartridge 16. The spray bar module 18 (FIG. 7) includes an outer containment wall 74, and an upper wall 76 covering the top of the module. The upper wall includes a vent 77 for allowing air to circulate upwardly out of the tower 10. An exhaust fan 79 is fitted to the vent to pull air upwardly through the tower. An air inlet 81 is located above the water level in the side wall of the base module 12. Air flow upwardly, counter current, to the flow of water. The lower edge of the containment wall 74 further includes a nesting shoulder 78 for nesting of the module 18 on top of the filter cartridge 14, 16. The module 18 further includes a spray bar assembly generally indicated at 78 including a fixed distribution assembly 80, a distribution spindle 82 that rotates within the distribution assembly 80, and a spray arm 84 attached to the spindle 82.

Figure 8:
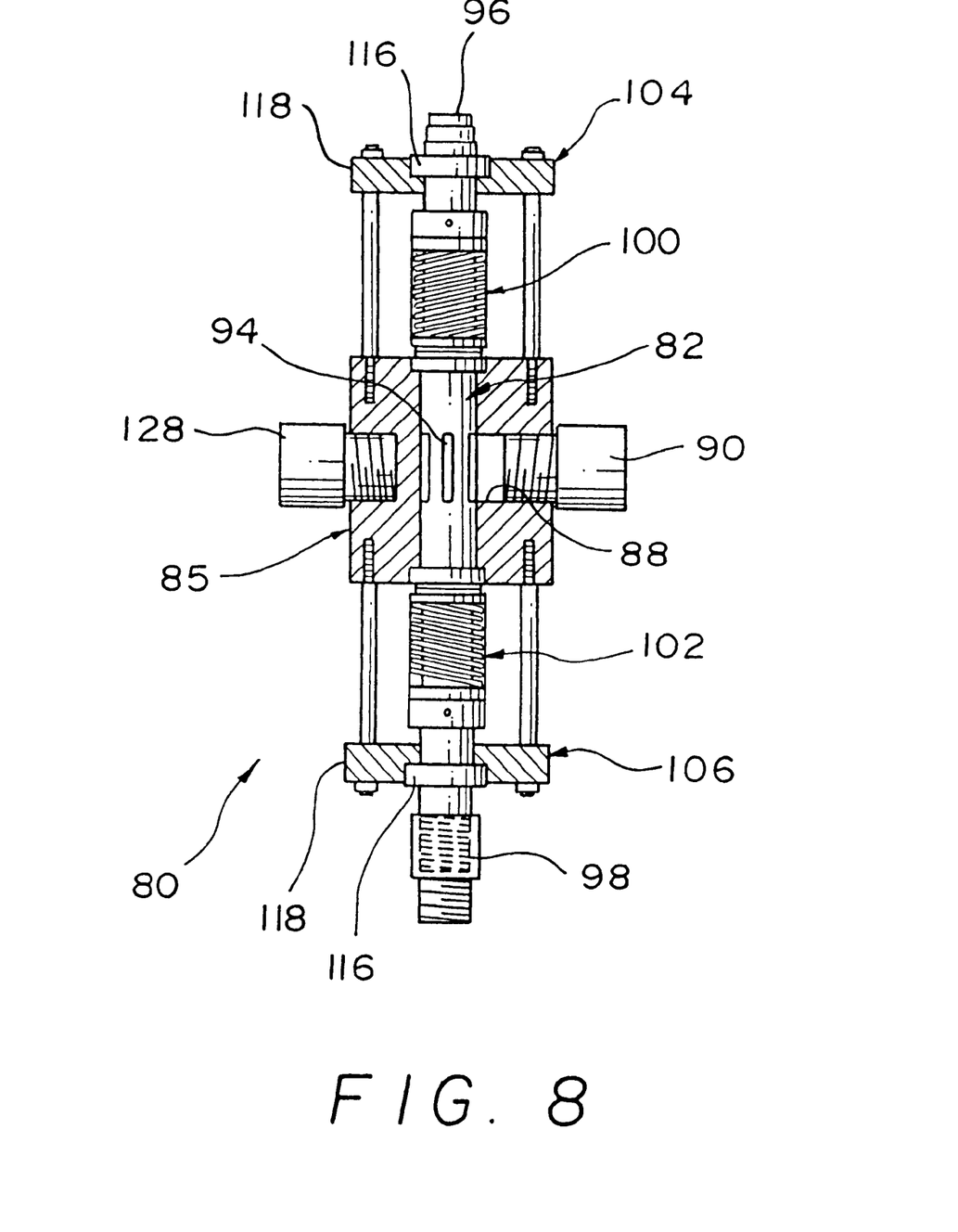
FIG. 8 is an enlarged cross-sectional view of the spray head assembly.
Figure 9:
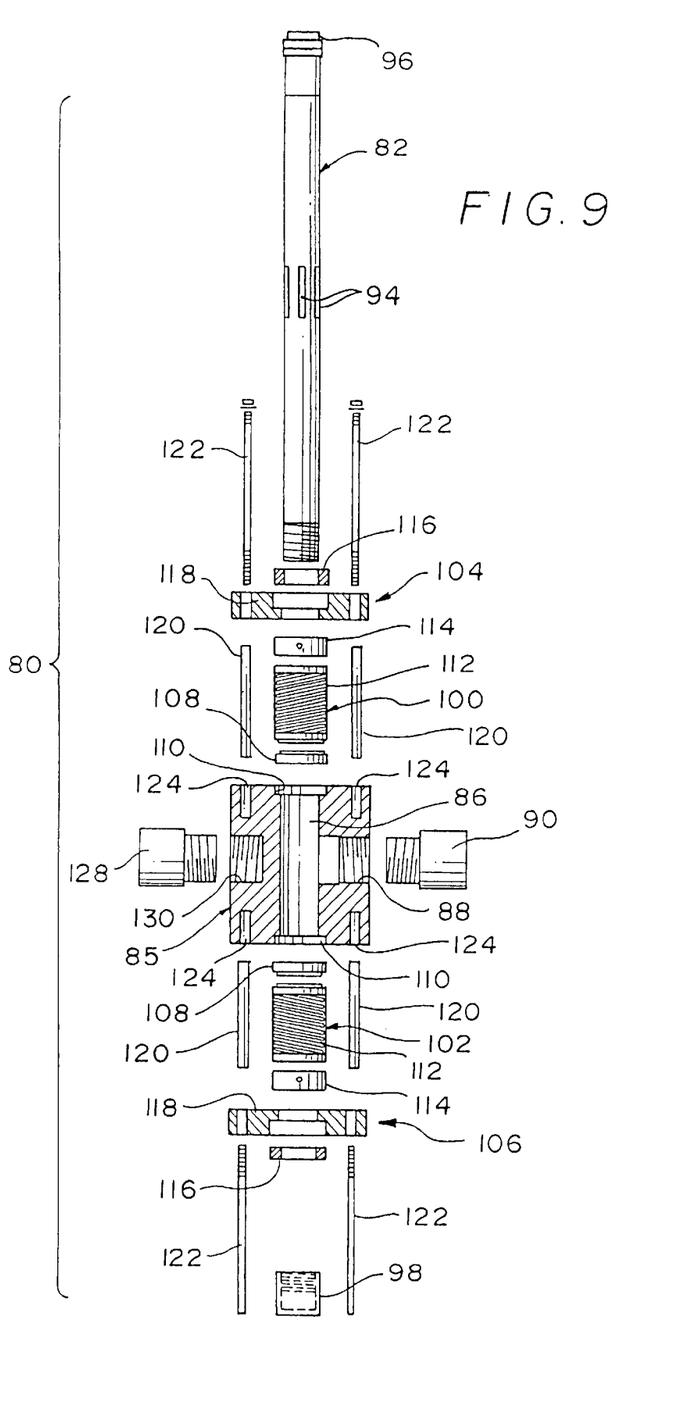
FIG. 9 is an exploded assembly view thereof.

Turning to FIGS. 8 and 9, the distribution assembly 80 comprises a body portion 85 having an axial bore 86, and a radially extending inlet bore 88. A nipple 90 is connected to the inlet bore 88 for attaching a wastewater supply pipe 92 to the body. The spindle 82 is rotatably received within the axial bore 86 and includes a plurality of longitudinally extending slots 94. The slot 94 are aligned with the inlet bore 88 and permit wastewater to enter into the interior of the spindle 82. The spindle 82 is closed with a cap 96 at the upper end, and provided with a nipple 98 at the lower end for connection to the spray arm 84. It is noted that the edges of the slots 94 are configured with a sharp edge that cooperates with the sidewalls of the bore 86 to provide a macerating or cutting action in the event that solids are carried through to the water distribution system 80. Any such solids entering the spray arm 84 would clog the system. The spindle 82 is received through two opposing seal assemblies generally indicated at 100 and 102, and two opposing bearing assemblies generally indicated at 104, 106. Each seal assembly 100, 102 includes a seal 108 received in a counter bore 110 at the upper and lower openings of the axial bore 86. The corresponding seals 108 are pressed in place around the spindle 82 by a spring 112 and locking collar 114 received around the spindle 82. Each bearing assembly 104, 106 comprises a bearing 116 and bearing plate 118 mounted in spaced relation from the end faces of the body 85. The bearing plate 118 is supported by a plurality of elongated bushings 120 and threaded bolts 122 that pass through the bearing plate 118 and bushings and into threaded bores 124 in the end faces of the body 85. The body portion 85 is rigidly suspended in the center of the cylindrical module 18 by a supporting cross pipe 126 that extends from the side wall into a threaded nipple 128 attached received in a threaded bore 130 on one side of the body 85. The wastewater supply pipe 92 that extends from the opposing side wall into the other side of the body portion 85 supports the opposing side of the body 85. The wastewater supply pipe 92 is connected to the outlet line of the pre-filter, to receive wastewater into the body 85 of the distribution assembly 80. The spray arm 84 includes a plurality of angled nozzles 132 that uniformly spray wastewater downwardly over the upper surface of the filter cartridge 16.

As water is pumped through the water distribution assembly 80, the water exits the angled nozzles 132 and generates a centrifugal force that causes the spray bar 84 to naturally rotate. Accordingly, the only motorized part of the system is the pump 40. As the spray bar 84 rotates, it provide a uniform spray of wastewater over the top of the biomedia filter cartridge 16. The wastewater then trickles down the vertical lengths 70 of tensioned biomedia 68 in a laminar flow. The laminar flow is for the most part created by tensioning of the media in a vertical orientation between the upper and lower hanger rings 60. As indicated above, laminar flow is highly desirable because a laminar flow of water creates a uniform flow and keeps more of the water in closer contact with the surface of the biomedia. This in turn gives the microorganisms a longer, more uniform exposure to the wastewater, and therefore a more efficient treatment system. The wastewater eventually trickles back down into the tank 22 and is re-circulated for further treatment.

In a typical treatment scenario, a slow stream of influent is fed into the holding tank 22 through the inlet 32 where it is mixed with wastewater 24 that has already been partially treated. As the influent enters, treated effluent exits through the outlet 34 to maintain a constant level within the tank 22.

The following examples are experimental pilot studies of the use and effectiveness of the present system in reducing $BOD_5$/COD, ammonia ($NH_3$—N), and phosphorous (P) levels in food processing plants.

EXAMPLE 1

Beverage Bottling Plant

Plant Characteristics

A beverage bottling and packaging facility specializing in the manufacture of high fructose fruit juices and tea made from concentrate. The company's strong organic effluent discharged to the local wastewater treatment facility resulted in costly $BOD_5$ surcharges.

Trickle Tower Installation

Over a period of two months, wastewater was fed through a two filter cartridge trickle tower constructed in accordance with the present invention. Influent $BOD_5$ to the trickle tower averaged 532 mg/L.

Results

Figure 10:
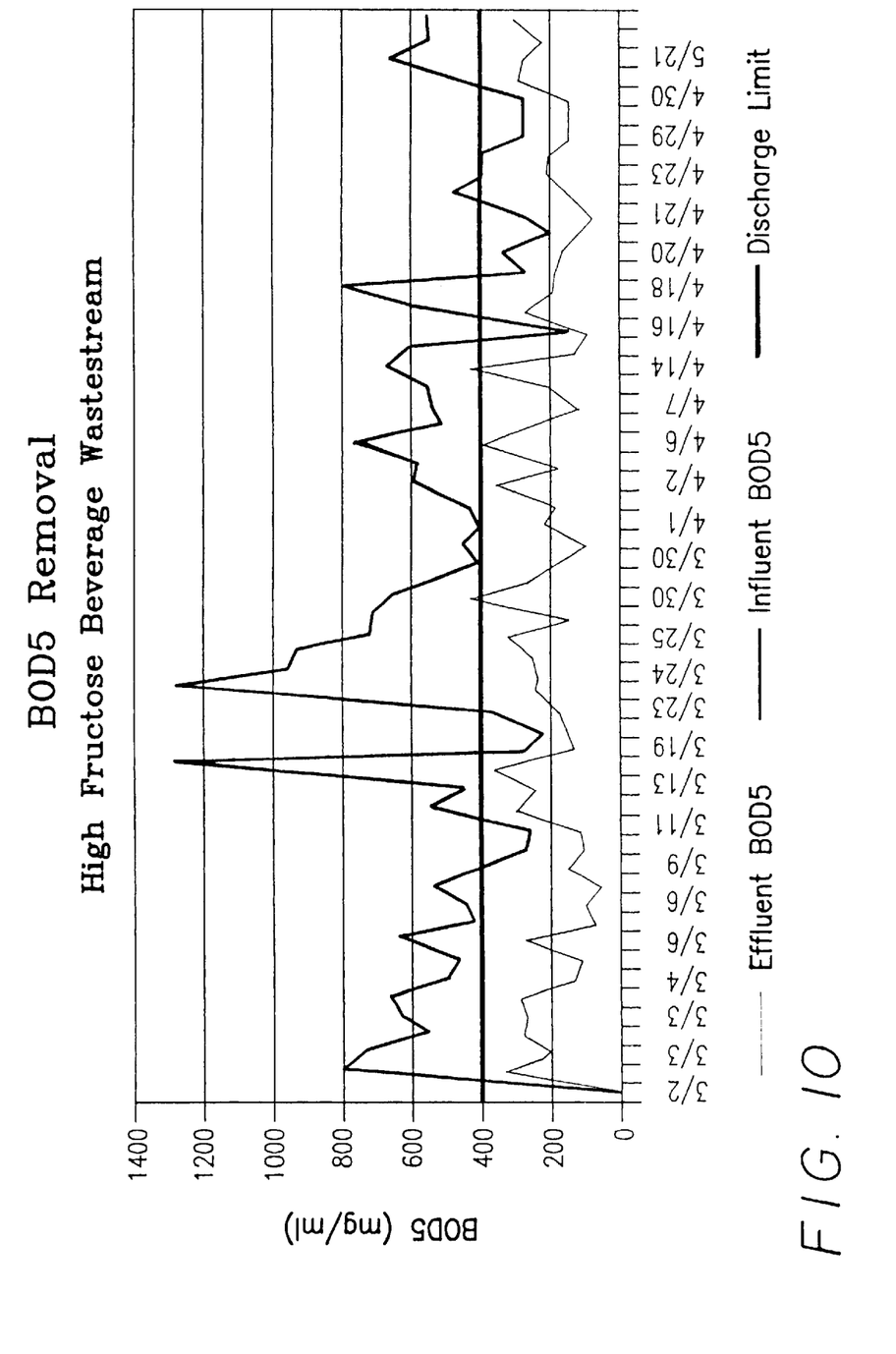
FIG. 10 is a graphical illustration of test results for the present trickle tower as used to process wastewater containing a high fructose level.

The tower consistently reduced $BOD_5$ levels to below the discharge limits of 400 mg/L thereby reducing costly effluent surcharges. Detailed results of the study are graphically illustrated FIG. 10.

EXAMPLE 2

Manufacturing Plant (Ammonia Effluent)

Plant Characteristics

A manufacturing facility was repeatedly troubled by high ammonia levels in effluent wastewater.

Trickle Tower Installation

Over a period of two months, wastewater was fed through a two filter cartridge trickle tower (100 gallon capacity) constructed in accordance with the present invention. Influent ammonia to the trickle tower averaged 12.4 mg/L.

Results

Figure 11:
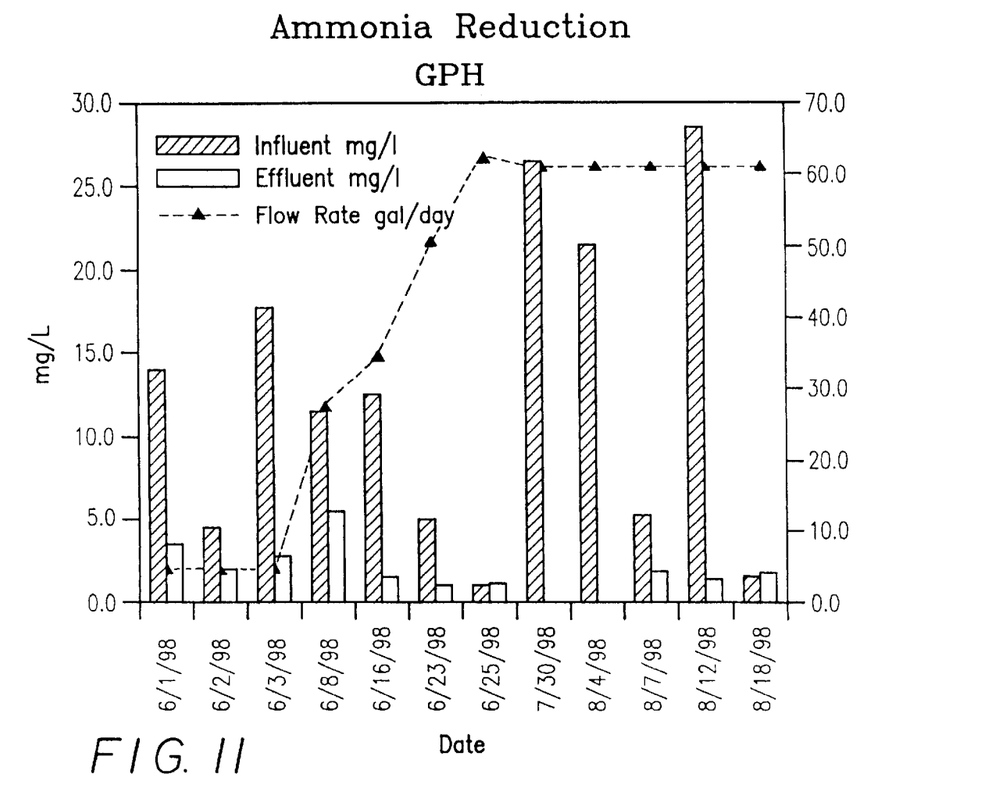
FIG. 11 is a graphical illustration of test results for the present trickle tower as used to process wastewater containing ammonia.

Data from the pilot study is found in TABLE 1 below, and is graphically illustrated in FIG. 11. The tower consistently reduced ammonia levels to an average of 1.85 mg/L. Detailed results of the study are graphically illustrated in FIG. 11

TABLE 1

| Date | Influent mg/l | Effluent mg/l | Flow Rate gal/day | Avg. Removal |
|---|---|---|---|---|
| 6/1/98 | 3.7 | 3.4 | 5.0 | 75% |
| 6/2/98 | 4.5 | 2.1 | 5.0 | 53% |
| 6/3/98 | 17.7 | 2.7 | 5.0 | 85% |
| 6/8/98 | 11.4 | 5.7 | 27.7 | 50% |
| 6/16/98 | 12.4 | 1.4 | 34.4 | 89% |
| 6/23/98 | 4.9 | 0.9 | 50.7 | 82% |
| 6/25/98 | 1.0 | 1.1 | 62.2 | −10% Flow Maxed Out |
| 7/30/98 | 26.4 | 0.0 | 60.7 | 100% |
| 8/4/98 | 21.4 | 0.0 | 60.7 | 100% |
| 8/7/98 | 5.2 | 1.6 | 60.7 | 65% |
| 8/12/98 | 28.4 | 1.4 | 60.7 | 95% |
| 8/16/98 | 1.6 | 1.8 | 60.7 | −13% Pump Replaced (6/19) |
| | | | 41.13 | 64% |

EXAMPLE 3

Fish/Squid Processing Plant
Plant Characteristics

A fish squid processing facility generating large quantities of COD and $BOD_5$ rich wastewater. The large amount of wastewater generated, and the excessively high $BOD_5$ content resulted in costly surcharges levied by the local sewer authority. The facility sought federal funding and proceeded with a number of different treatment alternatives including the present invention.

Trickle Tower Installation

Three multiple filter cartridge tower assemblies BT1, BT2 and BT3 were installed, and run in series, with effluent from the first trickle tower passing to the next trickle tower in series. According to initial design considerations, the three tower system was calculated to be undersized by 50% (funding issues prevented a larger installation). Each tower included up to 60,000 linear feet of looped cord media).

Wastewater was fed from a central holding tank in the floor of the plant to a tangential screen which removed large solids. Untreated wastewater was pumped through a lamella clarifier, then to two large equalization tanks EQ1 and EQ2 (sized for a 2-day storage of effluent), Solids were disposed of in a sludge holding tank. After equalization, untreated wastewater is fed through a heater tank and into the trickle towers.

Flow volume: 25,000 gallons per day
Influent $BOD_5$: 1,700 mg/L
Effluent $BOD_5$: 178 mg/L Results The tower installation provided average $BOD_5$ reductions of 78–90% and surpassed expectations despite being undersized for the flow volume.

Figure 12:
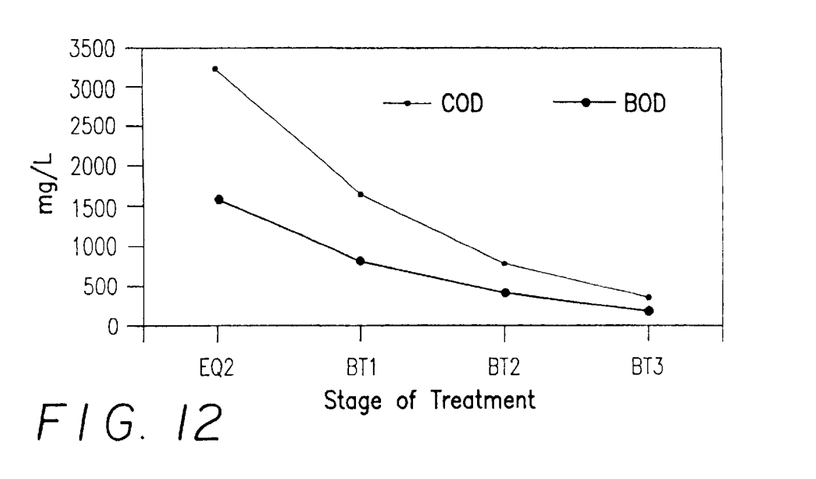
FIG. 12 is a graphical illustration of test results for the present trickle tower as used to process wastewater from a fish processing plant.

Detailed results of the study are graphically illustrated in FIG. 12. Data points represent effluent levels at various stages through the process.

EXAMPLE 4

Ice Cream Manufacturing Plant
Plant Characteristics

An ice cream manufacturing plant had a high COD levels in effluent discharged to the local wastewater treatment facility.

Trickle Tower Installation

Over a period of 40 days, wastewater was fed through a two filter cartridge trickle tower constructed in accordance with the present invention. Influent COD levels averaged 2254 mg/L. Flow rates averaged about 1 gallon per hour. Raw data for the pilot study is shown in Table 2 below.

Results

Figure 13:
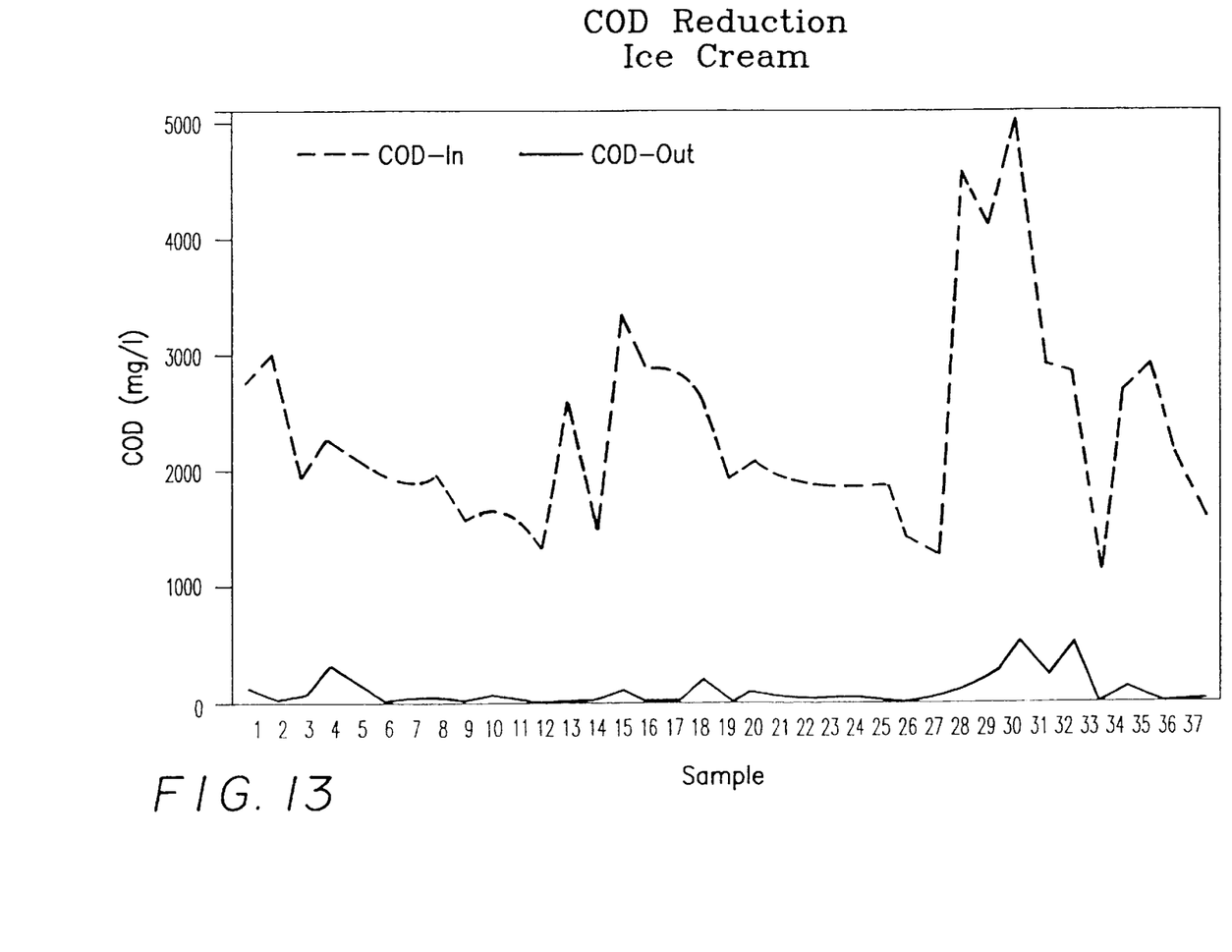
FIG. 13 is a graphical illustration of test results for the present trickle tower as used to process wastewater from an ice cream manufacturing facility.

The tower consistently reduced COD levels 90–100%. Detailed results of the study are graphically illustrated in FIG. 13.

TABLE 2

| # | COD-In | COD-Out | Flow Rate (ml/min) | Flow Rate (gal/min) | % Red | Date | Time |
|---|---|---|---|---|---|---|---|
| 1 | 2750 | 100 | 25 | 0.006604475 | 96% | 5/14/99 | AM |
| 2 | 2980 | 40 | 25 | 0.006604475 | 99% | 6/8/99 | PM |
| 3 | 1886 | 63 | 25 | 0.006604475 | 97% | 6/9/99 | AM |
| 4 | 2238 | 300 | 25 | 0.006604475 | 87% | 6/9/99 | PM |
| 5 | 2050 | 170 | 25 | 0.006604475 | 92% | 6/10/99 | AM |
| 6 | 1920 | 30 | 30 | 0.00792537 | 98% | 6/10/99 | PM |
| 7 | 1840 | 50 | 30 | 0.00792537 | 97% | 6/11/99 | AM |
| 8 | 1900 | 50 | 35 | 0.009246265 | 97% | 6/11/99 | PM |
| 9 | 1556 | 36 | 35 | 0.009246265 | 98% | 6/14/99 | AM |
| 10 | 1620 | 60 | 35 | 0.009246265 | 96% | 6/14/99 | PM |
| 11 | 1563 | 37 | 34 | 0.009246265 | 98% | 6/15/99 | AM |
| 12 | 1310 | 10 | 35 | 0.009246265 | 99% | 6/15/99 | PM |
| 13 | 2570 | 20 | 35 | 0.009246265 | 99% | 6/16/99 | AM |
| 14 | 1480 | 30 | 35 | 0.009246265 | 98% | 6/16/99 | PM |
| 15 | 3330 | 90 | 65 | 0.017171635 | 97% | 6/17/99 | AM |
| 16 | 2870 | 20 | 65 | 0.017171635 | 99% | 6/17/99 | PM |
| 17 | 2874 | 10 | 65 | 0.017171635 | 100% | 6/18/99 | AM |
| 18 | 2670 | 190 | 65 | 0.017171635 | 93% | 6/18/99 | PM |
| 19 | 1900 | 30 | 45 | 0.011888055 | 98% | 6/21/99 | AM |
| 20 | 2046 | 80 | 45 | 0.011888055 | 96% | 6/22/99 | PM |
| 21 | 1900 | 60 | 38 | 0.010038802 | 97% | 6/22/99 | PM |
| 22 | 1860 | 50 | 38 | 0.010038802 | 97% | 6/23/99 | AM |
| 23 | 1800 | 40 | 30 | 0.00792537 | 98% | 6/23/99 | PM |
| 24 | 1820 | 50 | 30 | 0.00792537 | 97% | 6/24/99 | AM |
| 25 | 1860 | 30 | 30 | 0.00792537 | 98% | 6/24/99 | PM |

TABLE 2-continued

| # | COD-In | COD-Out | Flow Rate (ml/min) | Flow Rate (gal/min) | % Red | Date | Time |
|---|---|---|---|---|---|---|---|
| 26 | 1370 | 10 | 30 | 0.00792537 | 99% | 6/28/99 | AM |
| 27 | 1303 | 43 | 30 | 0.00792537 | 97% | 6/29/99 | AM |
| 28 | 4570 | 126 | 30 | 0.00792537 | 97% | 6/29/99 | PM |
| 29 | 4130 | 243 | 60 | 0.01585074 | 94% | 6/30/99 | AM |
| 30 | 5016 | 510 | 80 | 0.02113432 | 90% | 6/30/99 | PM |
| 31 | 2926 | 230 | 80 | 0.02113432 | 92% | 7/1/99 | AM |
| 32 | 2633 | 496 | 58 | 0.015322382 | 82% | 7/1/99 | PM |
| 33 | 1150 | 10 | 60 | 0.01585074 | 99% | 7/2/99 | AM |
| 34 | 2670 | 110 | 60 | 0.01585074 | 96% | 7/2/99 | PM |
| 35 | 2906 | 50 | 60 | 0.01585074 | 98% | 7/5/99 | PM |
| 36 | 2090 | 10 | 90 | 0.02377611 | 100% | 7/6/99 | AM |
| 37 | 1600 | 30 | 90 | 0.02377611 | 98% | 7/6/99 | PM |
| 38 | 1610 | 30 | 90 | 0.02377611 | 98% | 7/7/99 | AM |
| 39 | 1550 | 90 | 85 | 0.022455215 | 94% | 7/6/99 | AM |
| 40 | 1850 | 10 | 85 | 0.022455215 | 99% | 7/8/99 | PM |
| Avg. | 2254 | 91.1 | 48.35 | 0.012773055 | 96% | | |

It can therefore be seen that the present invention provides a highly efficient trickle tower filter apparatus. The improved looped cord biomedia filter cartridge provides a huge surface area on which microorganisms can be populated, and further provides improved flow characteristics to create a laminar consistent flow of wastewater over the surface of the media while also allowing a superior air flow over the surfaces of the biomedia. Tensioning of the media in spaced parallel relation is critical in the improved operation of the filter cartridge. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A trickle tower filter apparatus comprising:
 a base tank holding a volume of wastewater to be processed;
 a biomedia filter assembly mounted on top of the base tank, said biomedia filter assembly comprising a frame having a plurality of upper and lower horizontally extending, parallel, spaced hangers, said biomedia filter assembly further comprising a looped cord biomedia interlaced, under tension, between said upper and lower spaced hangers to create a plurality of parallel vertically extending, substantially equally spaced, linear lengths of looped cord biomedia, said tensioned, vertically extending lengths of looped cord media being effective for creating a laminar downward flow of wastewater over the surfaces of the looped cord biomedia;
 said biomedia filter assembly being circular in shape and said plurality of upper and lower hangers comprising concentric rings having circumferentially spaced notches for interlacing said looped cord biomedia;
 a rotatable spray bar mounted on top of the biomedia filter assembly; and
 a pump connected between the base tank and the spray bar, said pump continuously circulating wastewater from the base tank to the spray bar, said spray bar rotating to provide a uniform spray of wastewater over the top of the biomedia filter assembly, said wastewater trickling down the vertical lengths of looped cord biomedia in a laminar flow where the wastewater comes into contact with biologically active microorganisms on the biomedia effective for digesting wastes in the wastewater, said wastewater trickling back into the base tank for re-circulation.

2. The trickle tower filter apparatus of claim 1 wherein said concentric rings are substantially equally spaced and said notches are substantially equally spaced.

3. The trickle tower filter apparatus of claim 1 wherein said base tank includes an inlet for introducing untreated influent into the base tank and an outlet for releasing treated effluent from the base tank.

4. The trickle tower filter apparatus of claim 1 wherein said base tank, said biomedia filter assembly, and spray bar are mounted within a housing, said housing creating a substantially self-contained environment.

5. The trickle tower filter apparatus of claim 4 further comprising means for controlling the environment within the housing.

6. The trickle tower filter apparatus of claim 4 further comprising a gas injection system for injecting a gas into the wastewater.

7. The trickle tower filter apparatus of claim 6 wherein said gas is pure oxygen.

8. The trickle tower filter apparatus of claim 1 wherein said spray bar comprises a centrifugal spay bar that rotates on forces created by the water exiting angled nozzles on the spray bar.

9. The trickle tower filter apparatus of claim 1 wherein said base tank, said biomedia filter assembly and said spray bar are constructed as modular units, each unit comprising an independent module that can be assembled and disassembled from the other modules.

10. A biomedia filter cartridge comprising:
 a frame having a plurality of upper and lower horizontally extending, parallel, spaced hangers, each of said upper hangers being associated with a corresponding lower hanger;
 a looped cord biomedia vertically interlaced, under tension, between said corresponding upper and lower spaced hangers to create a plurality of parallel vertically extending, linear lengths of looped cord biomedia, said tensioned, vertically extending lengths of looped cord media creating a laminar downward flow of wastewater over the surfaces of the looped cord biomedia;

said biomedia filter cartridge being cylindrical in shape; and said upper and lower spaced hangers comprising spaced concentric rings having circumferentially spaced notches for interlacing said looped cord biomedia.

11. The biomedia filter cartridge of claim 10 wherein said upper and lower concentric rings are substantially equally radially spaced and said notches are substantially equally circumferentially spaced.

12. The biomedia filter cartridge of claim 11 wherein said concentric hanger rings are mounted on nested tubular frame segments.

13. The biomedia filter cartridge of claim 12 wherein there are first, second and third nested frame segments.

14. The biomedia filter cartridge of claim 10 wherein said concentric hanger rings are mounted on nested tubular frame segments.

15. The biomedia filter cartridge of claim 14 wherein there are first, second and third nested frame segments.

16. A trickle tower filter apparatus, comprising:

a base tank for wastewater;

a biomedia filter assembly mounted above said base tank and having upper and lower hangers with looped cord biomedia extending therebetween to create a plurality of linear lengths of looped cord biomedia;

said lengths of looped cord biomedia being tensioned between said upper and lower hangers;

said lengths of looped cord biomedia being spaced apart and all extending parallel to each other and to the vertical direction;

a spray head assembly mounted above the biomedia filter assembly; and a pump connected between the base tank and the spray head assembly for pumping wastewater from the base tank to the spray head assembly, the wastewater upon being discharged from the spray head assembly passing down the vertical tensioned lengths of looped cord biomedia back into the base tank.

17. The trickle tower filter apparatus of claim 16, wherein said hangers have spaced apart notches through which said looped cord biomedia is interlaced.

18. The trickle tower filter apparatus of claim 17, wherein said upper and lower hangers comprise a plurality of upper concentric rings and a plurality of lower concentric rings.

19. The trickle tower filter apparatus of claim 16, wherein said biqmedia filter assembly is circular in shape.

20. The trickle tower filter apparatus of claim 16, wherein said lengths of looped cord biomedia have upper and lower ends which are all respectively spaced apart and connected to said upper and lower hangers at equally spaced apart locations along said hangers.

21. A method of treating wastewater using a trickle tower, comprising the steps of:

spraying wastewater over a top of a biomedia filter assembly;

said biomedia filter assembly having vertically extending spaced-apart parallel lengths of looped cord biomedia;

tensioning and maintaining under tension and parallel the spaced-apart vertical lengths of looped cord biomedia;

trickling the wastewater down the tensioned vertical lengths of looped cord biomedia in laminar flow;

the wastewater coming into contact with biologically active microorganisms along the lengths of looped cord biomedia, these microorganisms digesting wastes in the wastewater;

collecting the wastewater after trickling down said vertical lengths of looped cord biomedia; and re-circulating the collected wastewater to again be sprayed over the top of said biomedia filter assembly.

22. The method of claim 21, wherein said vertical lengths of looped cord biomedia have upper and lower ends which are respectively maintained equally spaced apart.

23. The method of claim 21, further comprising the step of moving air upwardly through said biomedia filter assembly.

* * * * *